Figure 2:
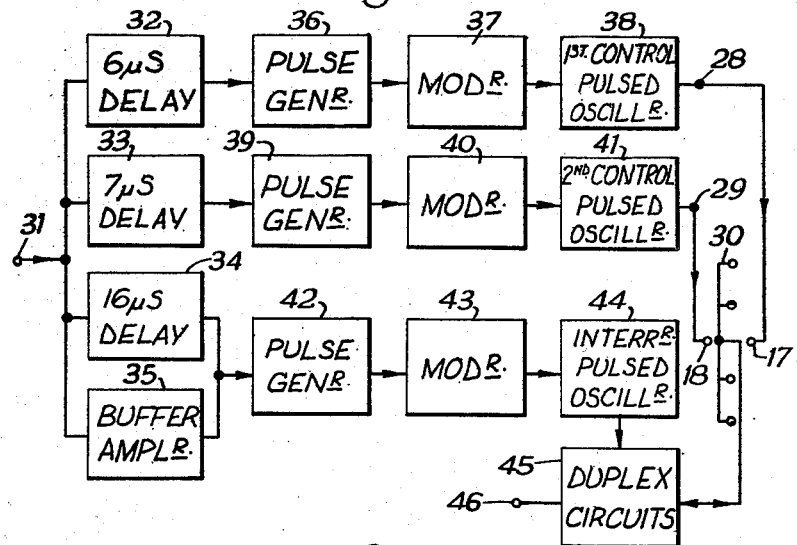

March 29, 1960  D. A. LEVELL  2,931,029
GROUND AERIAL ARRANGEMENTS FOR SECONDARY RADAR
Filed Feb. 13, 1956  2 Sheets-Sheet 1
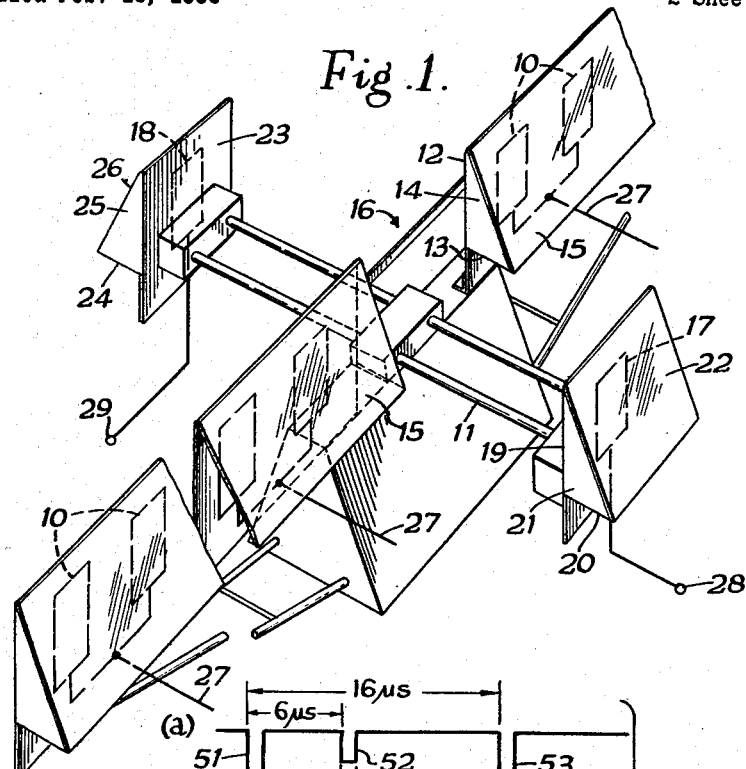
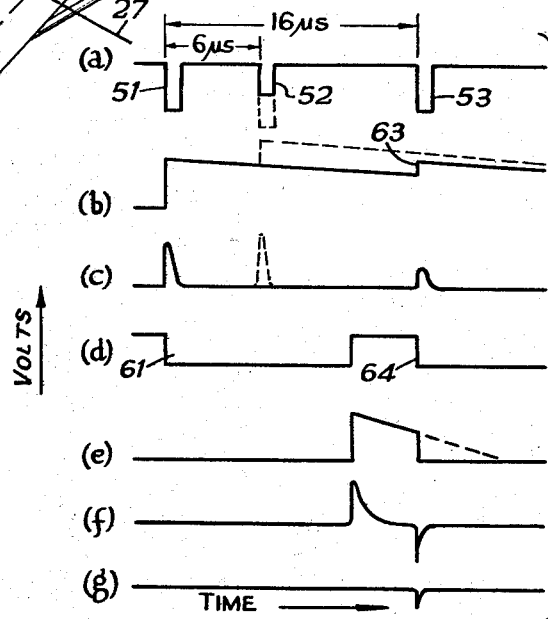
INVENTOR
Derek A. Levell
BY
Ralph B. Stewart
ATTORNEY March 29, 1960 D. A. LEVELL 2,931,029
GROUND AERIAL ARRANGEMENTS FOR SECONDARY RADAR
Filed Feb. 13, 1956 2 Sheets-Sheet 2

INVENTOR
Derek A. Levell
BY
Ralph B. Stewart
ATTORNEY

United States Patent Office 2,931,029
Patented Mar. 29, 1960

2,931,029

GROUND AERIAL ARRANGEMENTS FOR SECONDARY RADAR

Derek Alfred Levell, West Hendon, London, England, assignor to A. C. Cossor Limited, London, England Application February 13, 1956, Serial No. 565,184

Claims priority, application Great Britain February 18, 1955

7 Claims. (Cl. 343—6.5)

The present invention relates to improvements in ground aerial arrangements for secondary radar.

In some ground aerial arrangements previously used for secondary radar a directional interrogating aerial has been employed in combination with a control aerial system, the energy emitted from the control aerial being of an intensity intermediate that of the main and side lobes of the interrogating aerial. Such a system is described, for example, in the specification of British Patent No. 734,588, and U.S. patent to Levell et al. No. 2,824,301.

For efficient working of such a secondary radar system it is desirable that this relationship between the respective intensities shall be maintained in all directions; ideally the control aerial system has an intensity effect which is uniformly omni-directional.

It is an object of the present invention to improve the effective radiating characteristics of a control aerial and interrogating aerial arrangement for use in a secondary radar system.

According to the principal feature of the present invention there is provided for use in a secondary radar system a ground aerial arrangement comprising a horizontally extended directional interrogating aerial having radiating components lying approximately in a vertical plane and a control aerial comprising two or more components adapted to be separately energised and located upon opposite sides of the said vertical plane.

Preferably the said control aerial components are mounted centrally of the linearly extended directional interrogating aerial, with one component in front and another component behind the plane of the interrogating aerial, and the components having their maximum radiation in opposite directions.

Further according to the present invention a secondary radar system comprises a ground aerial arrangement according to the principal feature of the invention in combination with transmitting means connected to apply recurrent pulses of radio frequency energy to be radiated to the interrogating aerial and the control aerial components, the two or more control aerial pulses applied to the two or more components respectively preceding the interrogating aerial pulse and occurring at different times. The durations of the control aerial pulses are preferably such that they do not overlap.

It may be arranged that a device for working in conjunction with a combination as set forth, such for example as an aircraft transponder, is adapted to select and be actuated by that one of the two components radiated by the control aerial which has, at the device, the larger amplitude, in which case the effective control aerial pattern corresponds to the envelope of the maximum of the control signals radiated. The said device may also be so adapted that it is actuated in an additive manner by the control signals radiated.

Figure 3:
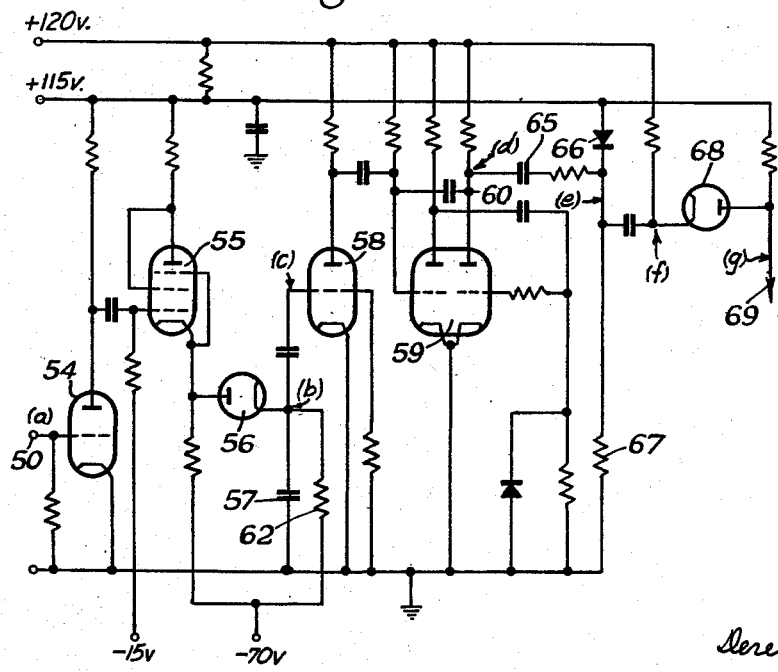

The invention will be described, by way of example, with reference to the accompanying drawings in which Fig. 1 is a partly schematic perspective view of parts of an aerial system according to the invention, Fig. 2 is a block circuit diagram of a combination of aerial system and transmitter according to the invention, Fig. 3 is a circuit diagram of a transponder that may be used to co-operate with the arrangement of Fig. 2, and Fig. 4 shows idealised waveforms that may be present in the circuit of Fig. 3. In Fig. 3 the waveforms at various points are identified by the reference letter of such waveforms in Fig. 4.

Referring to Fig. 1, the interrogating aerial in this example comprises an array of twenty-four metal plates 10, $\lambda/4$ high, and spaced $0.6\lambda$ apart. The array is mounted upon a supporting structure 11 adapted to be mounted on top of a primary radar aerial system. The plates 10 are mounted in metal boxes comprising a back portion 12, a bottom portion 13 and end portions 14, the fronts of the boxes being covered with transparent insulating material 15.

In the centre of the interrogating array is a gap 16 and opposite to this gap are mounted a front control aerial component 17 and a rear control aerial component 18. Each of these components is of the same construction as the plates 10 and the components are mounted upon the same support 11 as the interrogating aerial array. The front component 17 having its maximum of radiation forwards is mounted in a metal box having a back 19, bottom 20 and end portions 21, the front being covered by transparent insulating material 22. The rear component 18 has its maximum of radiation rearwards and is mounted in a metal box having a back 23, bottom 24 and end portions 25 and covered by a transparent front 26.

Terminals 27 of the interrogating aerial array are coupled, in known manner, through a distribution box (not shown), by which their phasing is suitably adjusted, to a transmitter. The control aerial components 17 and 18 are coupled by terminals 28 and 29 to other transmitters as will be described with reference to Fig. 2.

In Fig. 2 the directional interrogating aerial of Fig. 1 is shown diagrammatically at 30 and the control aerial components are shown at 17 and 18. Apart from modifications necessary in order to adapt the circuit for the present invention, it is the same as one of those described in the specification of the aforementioned British Patent No. 734,588.

Trigger pulses, for example from a primary radar, are applied at a terminal 31 and thence to three delay devices 32, 33 and 34 introducing delays of 6, 7 and 16 microseconds respectively, and a buffer amplifier 35 introducing negligible delay. Delayed pulses from 32 are applied to a pulse generator 36 which feeds one microsecond pulses to a modulator 37 coupled to a first control pulse oscillator 38 whose output is coupled to terminal 28 and thence to the front control aerial component 17. The pulses from 33 are applied through a like chain comprising a pulse generator 39, also generating one microsecond pulses, a modulator 40 and a second control pulsed oscillator 41 to terminal 29 and thence to the second control aerial component 18.

Pulses from 34 and 35 are applied to a pulse generator 42 which feeds one microsecond pulses to a modulator 43 coupled to an interrogator pulsed oscillator 44. The output of the oscillator 44 is applied through duplex circuits 45 to the interrogator aerial 30. The duplex circuits are of the well known kind used for common T/R and a terminal 46 is coupled in known manner to receiving and display equipment.

With the apparatus of Fig. 2, pairs of pulses are fed to the interrogator aerial 30, the first of the pulses of each pair being a reference pulse and the second an interrogating pulse occurring, in this example, 16 microseconds after the reference pulse. The pairs of pulses may be recurrent at 4 milliseconds for example. An arrangement of this kind using one control pulse between the reference and interrogating pulses is more fully described in the aforesaid British Patent 734,588.

In this example of the present invention there are transmitted between the reference and interrogating pulses two control pulses, one 10 microseconds before the interrogating pulse and the other 9 microseconds before the interrogating pulse, both control pulses having an energy intermediate between that in the main and side lobes of the interrogating aerial. These control pulses are radiated respectively by the front component 17, with a maximum energy forward, and the rear component 18 with a maximum energy rearward. In this way the effective control aerial pattern at a co-operating transponder may be made such as to correspond to the envelope of the maximum of an individual pattern or to the sum of the individual patterns due to each of the respective components of the control aerial in conjunction with the directional interrogating aerial.

Destructive interference between the control pulses at a cooperating transponder does not occur and the signal intensity at which the transponder is triggered is determined by the one of the two control pulses which is of greatest amplitude at the transponder. The fact that the time spacing between the control pulse and the interrogating pulse in a forward direction is 10 microseconds and in the rearward direction only 9 microseconds is unimportant since interrogation in the rearward direction is to be suppressed.

The two control pulses may of course be spaced from one another and from the interrogating pulse at other than the intervals given. A spacing between the control pulses of between 1 and 5 microseconds is usually suitable and the durations of the pulses are preferably such that they do not overlap.

A common transmitter may be used for both control pulses, the transmitter being switched from one aerial component to the other.

One form of transponder that may be used with the system of Fig. 2 is described in the aforementioned British patent and will be briefly described with reference to Fig. 3 together with the waveform diagram of Fig. 4.

The pulses received by a transponder are assumed to be as shown at (a) in Fig. 4 and these are applied from a transponder receiver (not shown) to a terminal 50. The pulses comprise a reference pulse 51, a control pulse 52 and an interrogating pulse 53. A valve 54 inverts and amplifies these pulses and applies them to a valve 55 connected as a cathode follower in the cathode circuit of which is a diode 56 in series with a storage capacitor 57.

The first pulse 51 charges the capacitor 57 and the rise in voltage shown in Fig. 4(b) is approximately differentiated as shown in Fig. 4(c), amplified by a triode 58 and applied to trigger a multivibrator 59. When triggered, the multivibrator generates at the point 60 a negative-going rectangular pulse 61 (Fig. 4(d)) of a predetermined duration which is made less than the interval (16 μs.) between pulses 51 and 53 and greater than maximum interval (7 μs.) between the pulse 51 and a control pulse.

The charge on the capacitor 57 decays, as shown in Fig. 4(b), at a rate determined by a resistor 62. Since, when the pulse 52 occurs, the amplitude thereof at the cathode of 55 is less than the voltage then remaining on the capacitor 57 at that time, this pulse has no effect on the waveform (b). If, as shown, the amplitude produced at the cathode of 55 by the pulse 53 is greater than the voltage then existing across the capacitor 57, a rise will occur as shown at 63 in the waveform (b) and the multivibrator 59 will be triggered again, generating a pulse 64.

A capacitor 65 is charged through a crystal rectifier 66 during the first pulse 61 of Fig. 4(d) and at the end of the pulse 61 the potential across the rectifier 66 rises as shown in Fig. 4(e). This potential falls at a rate determined largely by a resistor 67. If the multivibrator is retriggered before all the charge on the capacitor 65 has leaked away, the potential across the rectifier 66 falls abruptly as shown in Fig. 4(e). The potential changes across the rectifier 66 are approximately differentiated to produce the waveform (f) and a diode 68 passes only the negative-going parts of this waveform, thus producing the waveform (g) which is applied from 69 to trigger a transmitter which is not shown.

At close ranges in directions corresponding to side lobes of the interrogator aerial, the amplitude of the pulse 52 (Fig. 4(a)) will be greater than that of the pulses 51 and 53 as indicated by broken lines. In this case the level of the waveform (b) is raised as shown in broken line and this prevents re-triggering of the multivibrator when the pulse 53 occurs. The transmitter will not, therefore, be triggered.

I claim:

1. A secondary radar system comprising a horizontally extended directional interrogating aerial having radiating components lying approximately in a vertical plane, a control aerial having at least two components located upon opposite sides of said vertical plane, pulse transmitting means including first, second and third means supplying respectively in succession first, second and third pulses, means coupling said first and second means to said two components of said control aerial respectively, and means coupling said third means to said interrogating aerial.

2. A system according to claim 1, comprising fourth pulse supplying means supplying a fourth pulse preceding said first pulse, and means coupling said fourth pulse supplying means, to said interrogating aerial.

3. A system according to claim 1, wherein the said control aerial components are located to be intersected by a vertical plane perpendicular to the first-named plane and passing through the centre of the directional aerial.

4. A system according to claim 1, wherein said two components of said control aerial has two components arranged to have their maxima of radiation in opposite directions.

5. A system according to claim 1, wherein the said control aerial components are arranged in substantially the same horizontal plane as the interrogating aerial components.

6. A secondary radar system comprising a horizontally extended directional interrogating aerial having radiating components lying approximately in a vertical plane, a control aerial having at least two components located upon opposite sides of said vertical plane, pulse transmitting means including first, second and third means supplying respectively recurrent first, second and third pulses in a non-overlapping time sequence in the order named, means coupling said first and second means to said two components of said control aerial respectively, and means coupling said third means to said interrogating aerial.

7. A system according to claim 6, comprising fourth pulse supplying means supplying a fourth pulse preceding said first pulse, and means coupling said fourth pulse supplying means to said interrogating aerial.

References Cited in the file of this patent

UNITED STATES PATENTS

| 2,433,381 | Marchand | Dec. 30, 1947 |
| 2,594,916 | Gulnac | Apr. 29, 1952 |
| 2,606,282 | Lipkin | Aug. 5, 1952 |
| 2,741,759 | Parker et al. | Apr. 10, 1956 |
| 2,781,509 | Marshall | Feb. 12, 1957 |

FOREIGN PATENTS

| 492,418 | Canada | Apr. 28, 1953 |